United States Patent Office 2,862,025
Patented Nov. 25, 1958

2,862,025
CHLORAMPHENICOL INTERMEDIATE

Irving Levi, Montreal, Quebec, Canada, assignor to Charles E. Frosst & Co., Montreal, Quebec, Canada, a corporation of the Province of Quebec No Drawing. Application June 6, 1957
Serial No. 663,889

Claims priority, application Canada September 6, 1956

2 Claims. (Cl. 260—488)

The present invention relates to a new product and to a method for its preparation. More particularly, it relates to a new intermediate useful in the synthesis of chloramphenicol.

The new product of the present invention is the 2-bromo-1-p-nitrophenyl-1,3 - diacetoxypropanediol which corresponds to the general Formula II.

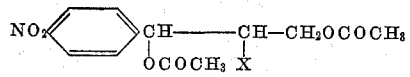

wherein X stands for bromine or chlorine.

This new product (II) is prepared by acetylating α-bromo-β-hydroxy-p-nitrohydrocinnamyl alcohol (I).

The novel intermediate (II) of the present invention is then reacted with α,α-dichloroacetamide to give the diacetate of chloramphenicol (III) which gives chloramphenicol (IV) by hydrolysis. The various reactions referred to above will be more fully understood by referring to the following flowsheet.

Flowsheet

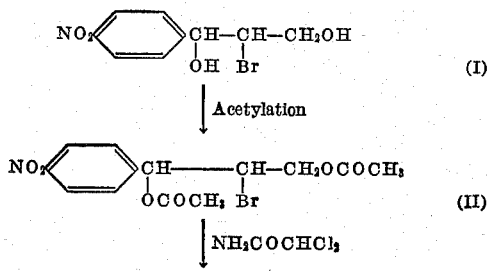

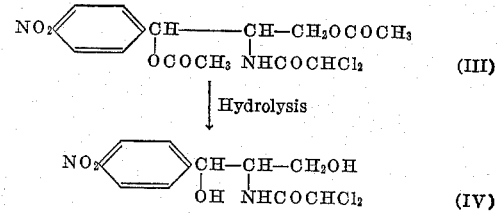

The starting α-bromo-β-hydroxy-p-nitrohydrocinnamyl alcohol may be acetylated by the usual acetylation reactions but preferably with acetic anhydride and pyridine either at room temperature or at reflux temperature.

Example

The following example is given to illustrate the preparation of the new product of the present invention.

Dry α-bromo-βhydroxy-p-nitrohydrocinnamyl alcohol (2.6 grams) were dissolved in 20 ml. pyridine, and 20 ml. acetic anhydride, and the clear solution allowed to stand at room temperature over night during which time the solution turned dark red. The reaction mixture was poured onto chipped ice (400 grams) and the resulting precipitate was extracted from the aqueous mixture with diethyl ether (3 x 40 ml.). The combined ether extracts were washed successively with 2% $H_2SO_4$ (2 x 30 ml.), 2% $Na_2CO_3$ solution (3 x 40 ml.) and water (3 x 25 ml.). The washed ether solution was dried over anhydrous sodium sulphate to which a small amount of decolourizing charcoal was added. The nearly colourless filtered solution was then concentrated to dryness. The resulting residue (3.0 grams) solidified completely at room temperature. Recrystallization from ethanol yielded transparent crystals (2.5 grams) which melted at 94–96° C.

I claim:

1. As a new product, 2-halo-1-p-nitrophenyl-1,3-diacetoxypropanediol of the general formula:

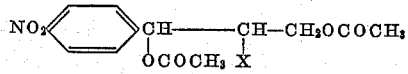

wherein X is selected from the group consisting of chloro and bromo.

2. As a new product, 2-bromo-1-p-nitrophenyl-1,3-diacetoxypropanediol.

References Cited in the file of this patent

Instituto Llorente Chem. Abs. 47 (1953), p. 5963.